United States Patent [19]

Christis

[11] Patent Number: 4,894,714

[45] Date of Patent: Jan. 16, 1990

[54] APPARATUS USING TELETEXT TO PROVIDE CHANNEL IDENTIFICATION INFORMATION IN A TELEVISION TRANSMISSION SYSTEM

[75] Inventor: Wilhelmus J. Christis, Eindhoven, Netherlands

[73] Assignee: U.S. Philips Corporation, New York, N.Y.

[21] Appl. No.: 104,319

[22] Filed: Oct. 2, 1987

[30] Foreign Application Priority Data

Oct. 3, 1986 [NL] Netherlands ............... 8602494

[51] Int. Cl.⁴ ............... H04N 7/10; H04N 7/087
[52] U.S. Cl. ............... 358/86; 358/147; 358/191.1
[58] Field of Search ............... 358/86, 146, 147, 191.1; 455/4; 380/13

[56] References Cited

U.S. PATENT DOCUMENTS

| | | | |
|---|---|---|---|
| 4,527,194 | 7/1985 | Sirazi | 358/86 |
| 4,600,921 | 7/1986 | Thomas | 358/84 X |
| 4,698,670 | 10/1987 | Matty | 358/86 |
| 4,701,794 | 10/1987 | Fröling et al. | 379/147 |
| 4,701,971 | 12/1987 | Nozaki et al. | 358/86 X |
| 4,706,121 | 11/1987 | Young | 358/146 X |

Primary Examiner—Keith E. George
Attorney, Agent, or Firm—Thomas A. Briody; Jack E. Haken; Anne E. Barschall

[57] ABSTRACT

In a television transmission system, for example, a community antenna television system the transmitter station transmits a teletext page in an information channel, which page indicates in which TV channels this transmitter station transmits programmes. A receiver associated with this system is directly tuned, after switching on, to this information channel or starts a searching action for this channel. Once tuned to this information channel the relevant teletext page is captured and the information regarding the TV channels is separated therefrom, decoded and stored in the form of tuning data in a tuning data memory. Each tuning datum corresponds to one of these TV channels. In this manner the tuning data memory is automatically programmed, i.e. without the users' interposition, for all receivable TV programmes.

17 Claims, 4 Drawing Sheets

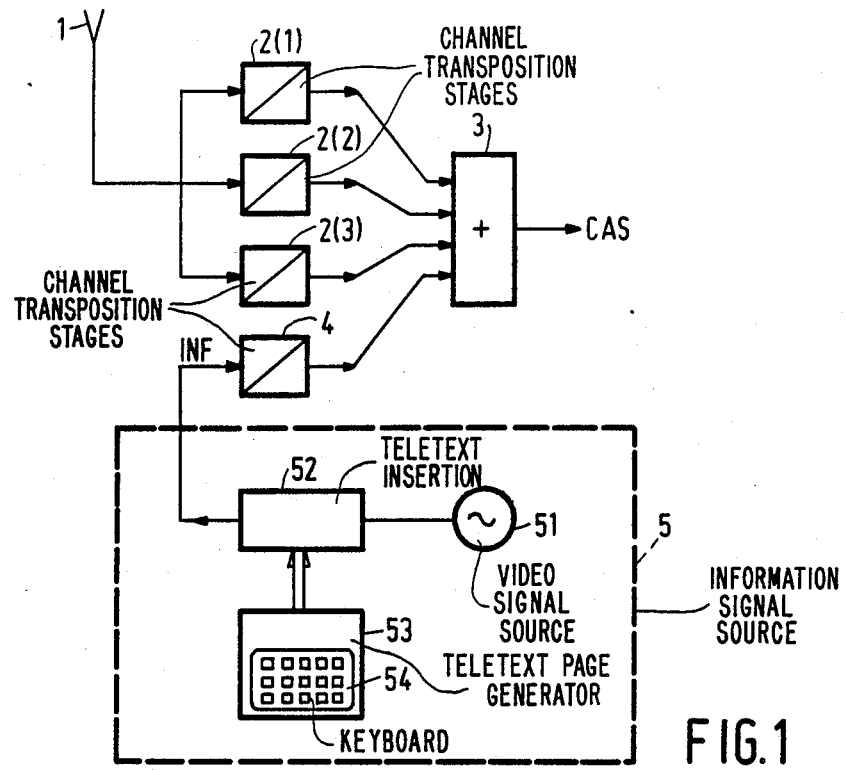
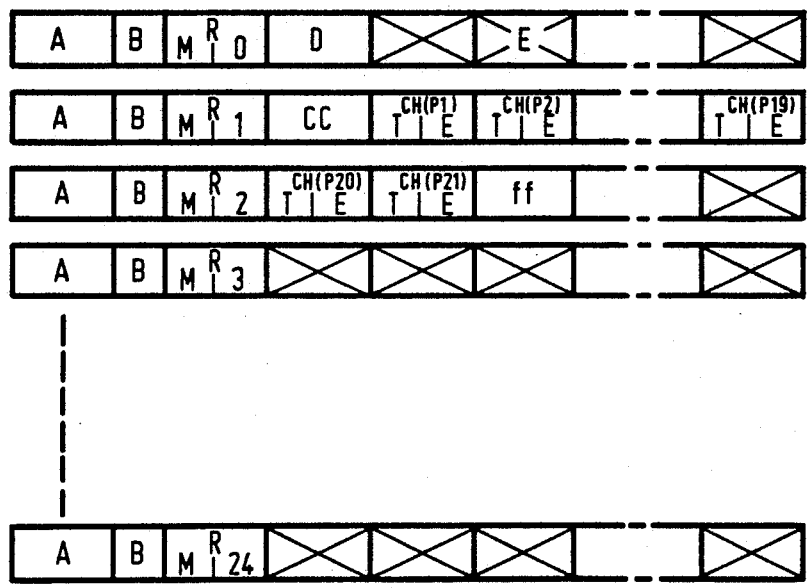

APPARATUS USING TELETEXT TO PROVIDE CHANNEL IDENTIFICATION INFORMATION IN A TELEVISION TRANSMISSION SYSTEM

BACKGROUND OF THE INVENTION

(1) Field of the Invention

The invention generally relates to a television transmission system with a transmitter station and one or more TV receivers. More particularly, the invention is usable within a community antenna television (CATV) system in which given TV programmes are transmitted at the transmitter end in different TV channels by the CATV license to the CATV subscribers. The invention may, however, also be used in a system in which TV signals are transmitted by a satellite, a video recorder, a video camera, etc.

(2) Description of the Prior Art

The stations transmitted in a CATV system include formed on the one hand by stations which are received via a community antenna and on the other hand by locally generated stations. Since the total channel presentation is determined by the CATV licensed, this presentation may differ from CATV system to CATV system. In addition the presentation may be extended, or the CATV license may find it necessary for organizational reasons to transmit stations in a different TV channel.

As is known, in Europe most modern TV receivers are programmable. This means that they are provided with a non-volatile tuning memory having a number of addressable memory locations each comprising tuning data with each tuning datum being characteristic of a given TV transmission frequency band. Each memory location can be addressed by the user by operating one or a combination of a plurality of keys which are present on a control panel. Furthermore the receiver has a programming mode and a tuning mode. If the receiver is brought to the tuning mode and whenever a memory location is addressed, the tuning datum present therein is applied to a tuning circuit of the receiver which is thus tuned to the TV channel indicated by the tuning datum. For programming the tuning memory the receiver is first brought to the programming mode. For each station to be received the user can now store the tuning datum characterizing the channel in which it is provided in a user-addressed memory location of the tuning memory. The user must, however, be informed about the channels via which stations are transmitted in the CATV system. To this end many CATV licenses nowadays transmit a local information station via an information channel. If the user knows the number of this information channel he can tune the receiver to this information channel and thus obtain the desired data.

OBJECT AND SUMMARY OF THE INVENTION

It is an object of the invention to simplify the programming of the above-mentioned tuning data memory.

In the television transmission system according to the invention the transmitter is therefore provided with:

means for generating teletext data which represents at least a repetitive part of a teletext information page which teletext data comprises information regarding the TV channels which are utilised by the transmitter for the transmission of TV stations;

means for transmitting this teletext data in an information channel allotted thereto; and the receiver is provided with:

a teletext decoding circuit for capturing and decoding teletext pages;

a tuning data memory for storing tuning data which are characteristic of TV channels;

a receiver tuning circuit for tuning the receiver in response to a tuning datum applied thereto to the TV channel characterized thereby, a control circuit which is coupled to the teletext decoding circuit, to the tuning data memory and to the tuning circuit and which is adapted to perform a store program comprising the following steps:

(a) tuning the receiver to the information channel;

(b) capturing and decoding of the teletext information page present in the information channel by the teletext decoding circuit;

(c) storing tuning data in the tuning memory in response to the captured teletext information page, which tuning data are characteristic of the TV channels indicated on said teletext information page and utilised by the transmitter for the transmission of TV stations.

It is to be noted that the information channel may be a TV-channel or another transmission channel such as an FM-channel whose bandwidth is smaller than that of a TV-channel.

The invention will be described in greater detail with reference to some Figures.

EXPLANATION OF THE INVENTION

Brief Description of the Figures

FIG. 1 diagrammatically shows a transmitter for use in a television transmission system, FIG. 2 diagrammatically shows the format of the teletext information page which is transmitted by the transmitter shown in FIG. 1.

References

1. Bipolar IC's for video equipment; Philips' Data Handbook Integrated Circuits, Part 2, Jan. 1983.
2. Computer Controlled Teletext; J. R. Kinghorn; Electronic Components and Applications, Vol. 6, No. 1, 1984, pages 15–29.
3. IC's for digital systems in radio, audio and video equipment; Philips' Data Handbook Integrated Circuits, Part 3, Sept. 1982.

The Structure of the Television Transmission System

Figure 3:
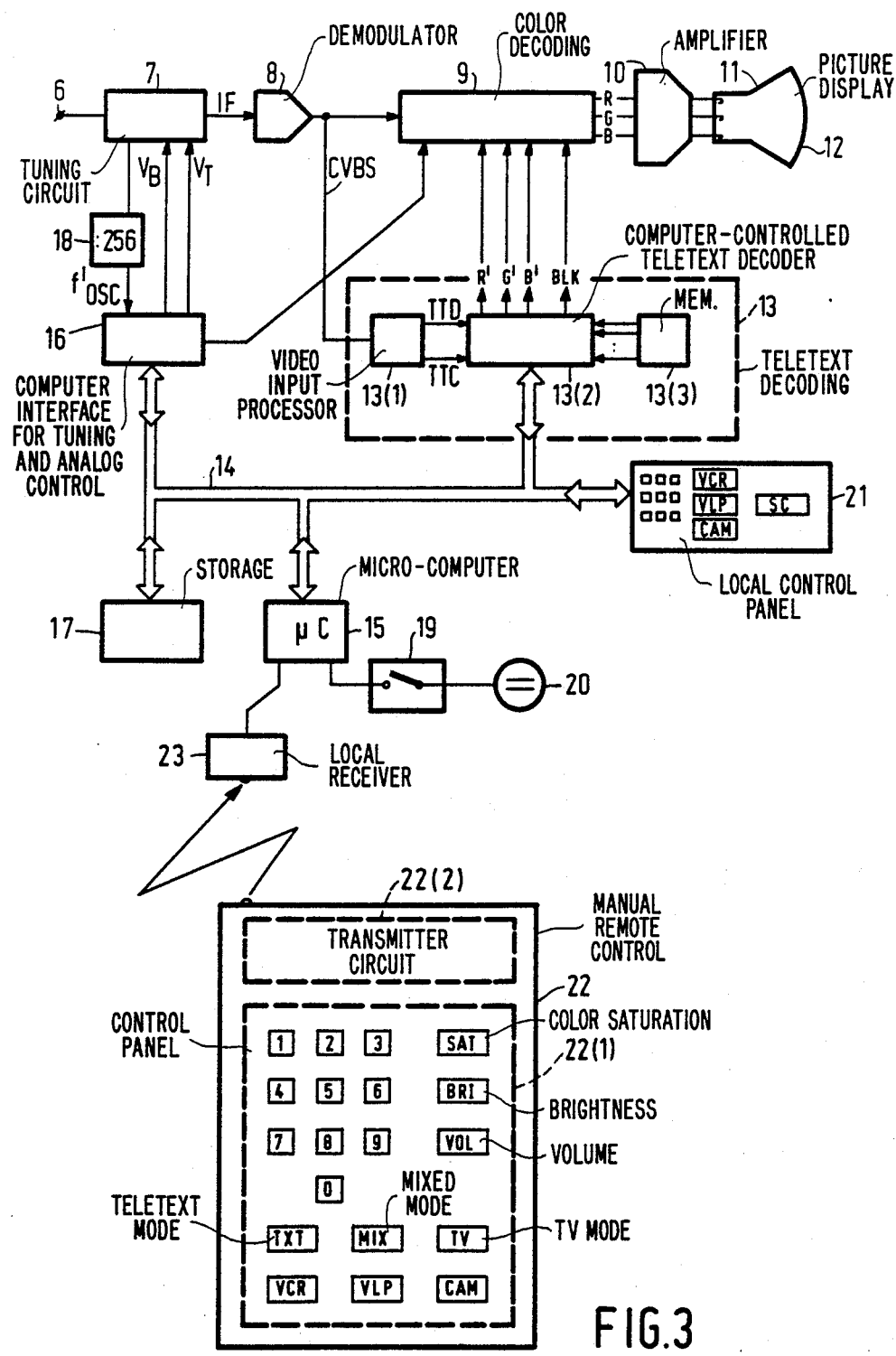
FIG. 3 shows a TV receiver for use in a television transmission system and being suitable for the reception of signals transmitted by the transmitter shown in FIG. 1, FIGS. 4 and 5 show diagrams to explain the operation of the receiver shown in FIG. 3.

FIG. 1 shows a transmitter station and FIG. 3 shows one of a large number of TV receivers of a community antenna television (CATV) system. The transmitter station is provided with a receiver antenna 1 for television signals. These signals are applied in known manner to a number of parallel arranged channel transposition stages 2(.) each transposing a television signal transmitted in a given TV channel to a CATV channel desired by the CATV licensee. The signals supplied by these channel transposition stages 2(.) are added in an adder circuit 3 so that the CATV signal CAS occurs at the output thereof, which signal is transmitted to the subscribers.

In addition to the channels transposed by the channel transposition stages 2(.) the CATV signal CAS also comprises an information channel for the transmission of an information signal INF which is applied via a channel transposition stage 4 to the adder circuit 3. This information signal is supplied by an information signal source 5. This source comprises a video signal source 51 supplying a baseband video signal for either a still or a changing picture. This video signal is applied to a known teletext insertion circuit 52 supplying the information signal INF. The desired teletext page which is present in this signal is received by the insertion circuit 52 from a teletext page generator 53 having a keyboard 54 which is operated by the CATV licensee.

More particularly the CATV licensee supplies a teletext information page which, as is shown in FIG. 2, consists of a number of lines like other teletext pages. Each line is defined by a teletext data packet. This commences in the conventional manner with a block A comprising a number of clock run-in bits, a block B with a framing code and a block R with a line prefix. The latter prefix comprises a magazine number M and a line number. In FIG. 2 the successive lines are denoted by the line numbers 0, 1, 2, ..., respectively. The line having line number 0 is referred to as page header and also conventionally comprises, inter alia, the page number in a block D and the header text in a block E.

The magazine number and the page number of this teletext information page are preferably standardized. For example, the magazine number is equal to one and the page number is a unique number for example, the hexadecimal number aa. Unique is understood to mean that the normal cycle of teletext pages of any magazine does not comprise this page number. The following lines of this teletext information page, in this example lines 1 and 2, comprise in a series of station numbers P1 to P21, for example, the associated channel numbers CH(P.). These channel numbers are in the sequence with an increasing index for P. This series of channel numbers is preceded by a starting code (for example, the hexadecimal code cc) and finishes with a final code (for example, the hexadecimal code ff). This series including the starting code and the final code is preferably provided with a Hamming protection described in the standing teletext standard. The channel numbers CH(P.) are coded as two BCD digits T (tens digits) and E (unit digit). In this manner at least 18 channel numbers can be accommodated in a teletext line.

The further lines of this teletext information page can be filled in an arbitrary manner. For example, they may also comprise the said channel numbers stating the name of the associated station with each number. It is to be noted that this information indicated on the further lines can also be supplied by the video signal source 51 and that the station P1 is preferably this information channel. This information is certainly to be generated by the video signal source 51 if the CATV licensee decides not to transmit this information via the further lines of the teletext information page and as long as there are CATV subscribers who do not have a receiver with a teletext decoding circuit. In fact it must also be possible for these subscribers to be informed of the program presentation.

FIG. 3 diagrammatically shows the general structure of a colour television receiver for use in the CATV system. It is provided with an antenna input 6 receiving the video signals which are supplied by the transmitter station shown in FIG. 1 and which are processed in a number of processing circuits. More particularly they are applied to a tuning circuit 7 (tuner or channel selector). This tuner receives band selection voltage $V_B$ in order to be able to tune the receiver to a frequency within one of the frequency bands VHF1; VHF2; UHF etc. Furthermore the tuner receives a tuning voltage $V_T$ in order to tune the receiver to the desired frequency within the frequency band selected. $V_B$ and $V_T$ together determine the channel to which the receiver is tuned.

The tuner 7 supplies an oscillator signal of the frequency $f_{OSC}$ on the one hand and an intermediate frequency signal IF on the other hand. The latter signal is applied to an IF amplification and demodulation circuit 8 which supplies a base band composite video signal CVBS. The Philips IC TDA 2540 described in reference 1 could be chosen for this circuit 8.

The signal CVBS thus obtained is also applied to a colour decoding circuit 9 which supplies the three elementary colour signals R, G, B which are in their turn applied via an amplifier circuit 10 to a picture display tube 11 for displaying programs on the display screen 12. In the colour decoding circuit 9, colour saturation, contrast and brightness are influenced by means of control signals. It also receives an additional set of elementary colour signals R', G' and B' as well as a switching signal BLK (Blanking) by means of which the primary colour signals R, G and B can be entirely or partly suppressed. A Philips IC associated with the TDA 356X group also described in reference 1 may be chosen for this circuit 9.

The video signal CVBS is also applied to a teletext decoding circuit 13. This circuit comprises a video input processor 13(1) receiving the video signal CVBS and separating the teletext data therefrom and supplying the latter over a data line TTD to a circuit 13(2) which will be referred to as computer-controlled teletext decoder (CCT decoder for short). This CCT decoder also receives a clock signal via a clock line TTC from the video input processor 13(1). It is also coupled to a memory 13(3) in which one or more teletext pages can be stored and which will therefore be referred to as page memory. This CCT decoder supplies the three previously mentioned elementary colour signals R', G' and B' and the switching signal BLK. The video input processor 13(1) can be constituted by the Philips IC SAA 5230, the CCT decoder 13(2) by the Philips IC SAA 5240 and the page memory by a 1K8 to 8K8 RAM. For an extensive description of the structure and operation of this teletext decoder 13 reference is made to reference 2 for the sake of brevity.

The CCT decoder 13(2) is also connected to a bus system 14. This system is also connected to a control circuit 15 in the form of a microcomputer, an interface circuit 16 and a non-volatile storage medium 17. The interface circuit 16 supplies the said band selection voltage $V_B$, the tuning voltage $V_T$ as well as the control signals for controlling the analog functions of contrast, brightness and colour saturation. It receives an oscillator signal of a frequency $f'_{OSC}$ which is derived by means of a frequency divider 18 with a division factor of 256 from the oscillator signal of the frequency $f_{OSC}$ which is supplied by the tuner 7. Tuner 7, frequency divider 18 and interface circuit 16 together constitute a frequency synthesis circuit. The Philips IC SAB 3035 known under the name of CITAC (Computer Interface for Tuning and Analog Control) and described in reference 3 may be chosen as an interface circuit.

The storage medium 17 is used to store tuning data each characterizing a TV channel in which a preselected program is transmitted. If such a tuning datum is applied to the interface circuit 16 under the control of the microcomputer 15, it supplies a given band selection voltage $V_B$ and a given tuning voltage $V_T$ so that the receiver is tuned to the desired channel. It is to be noted that for the sake of simplicity the tuning datum is hereinafter assumed to be identical to the channel number of the TV channel which it characterizes.

A specimen of the MAB 84 xx family manufactured by Philips may be taken as a microcomputer 15. Although the overall construction of a microcomputer is assumed to be generally known, it is to be briefly noted that it has a control program memory (generally a ROM) and a working memory. The manufacturer has stored a number of control programs in the control program memory and, if necessary, a number of fixed magnitudes. In the relevant case this control program memory comprises, for example, the magazine number and the page number of the teletext information page which is transmitted in the information channel.

To operate this receiver, a control system is present comprising, inter alia, an on/off switch 19 for supplying or interrupting supply voltage to the receiver and for establishing or interrupting the connection between a d.c. voltage source 20 and the reset input of the microcomputer. Furthermore this control system comprises a local control panel 21 which is also connected to the bus system 14 and which is provided with a number of keys for local control of the receiver. This local control panel 21 is adapted, inter alia, in such a manner that the user can program the tuning memory as he wishes, that is to say, he can store channel numbers of the desired stations in the tuning memory as he wishes. This manner of programming of the tuning memory will be referred to as "manual programming".

Finally the control system comprises a remote control system consisting of a manual apparatus 22 and a local receiver 23. This local receiver 23 has an output which is connected to an input (usually the "interrupt" input) of the microcomputer. It may be constituted by the Philips IC TDB 2033 which is described in reference 3 and is then intended for receiving infrared signals which are transmitted by the manual apparatus 22.

The manual apparatus 22 has a control panel 22(1) comprising a number of digit keys denoted by the digits 0 to 9. This control panel also comprises a number of further keys such as a colour saturation key SAT, a brightness key, BRI, a volume key VOL, a teletext mode key TXT, a mixed mode key MIX and a TV mode key TV. The teletext mode key is intended to bring the receiver from the TV mode to the teletext mode, whereas the TV mode key is intended to bring the receiver from the teletext mode to the TV mode. The control of the mixed mode key MIX brings the receiver to both the TV mode and the teletext mode so that the teletext information and the normal video signal can be simultaneously displayed on the screen 12. The keys of this control panel are coupled to a transmitter circuit 22(2) for which, for example, the Philips IC SAA 3004 can be chosen which is extensively described in reference 3. If a key is depressed, the transmitter circuit 22(2) generates a code specific of this key, which code is transmitted via an infrared carrier to the local receiver 23, demodulated in this receiver and subsequently presented to the microcomputer 15. Thus the microcomputer receives operating instructions and activates one of the circuits coupled thereto via the bus system 14. It is to be noted that an operating instruction may be single, that is to say, it is complete after depressing only one key. It may alternatively be multiple, that is to say, it is not complete until two or more keys have been depressed.

In the TV mode a preprogrammed program is allotted to each digit key. For example, the digit key 1 has the programme P1 allotted to it so that after depressing this digit key 1 the channel number CH (P1) in which this station P1 is transmitted is read from the tuning memory 17 and is applied to the interface circuit 16 which tunes the receiver to this TV channel. In the relevant case it will be assumed that the receiver is also tuned to this channel with the program P1 when the receiver is switched on by operating switch 19. For this reason the number of the information channel, if present, is preferably chosen for the channel number CH(P1).

Figure 4:
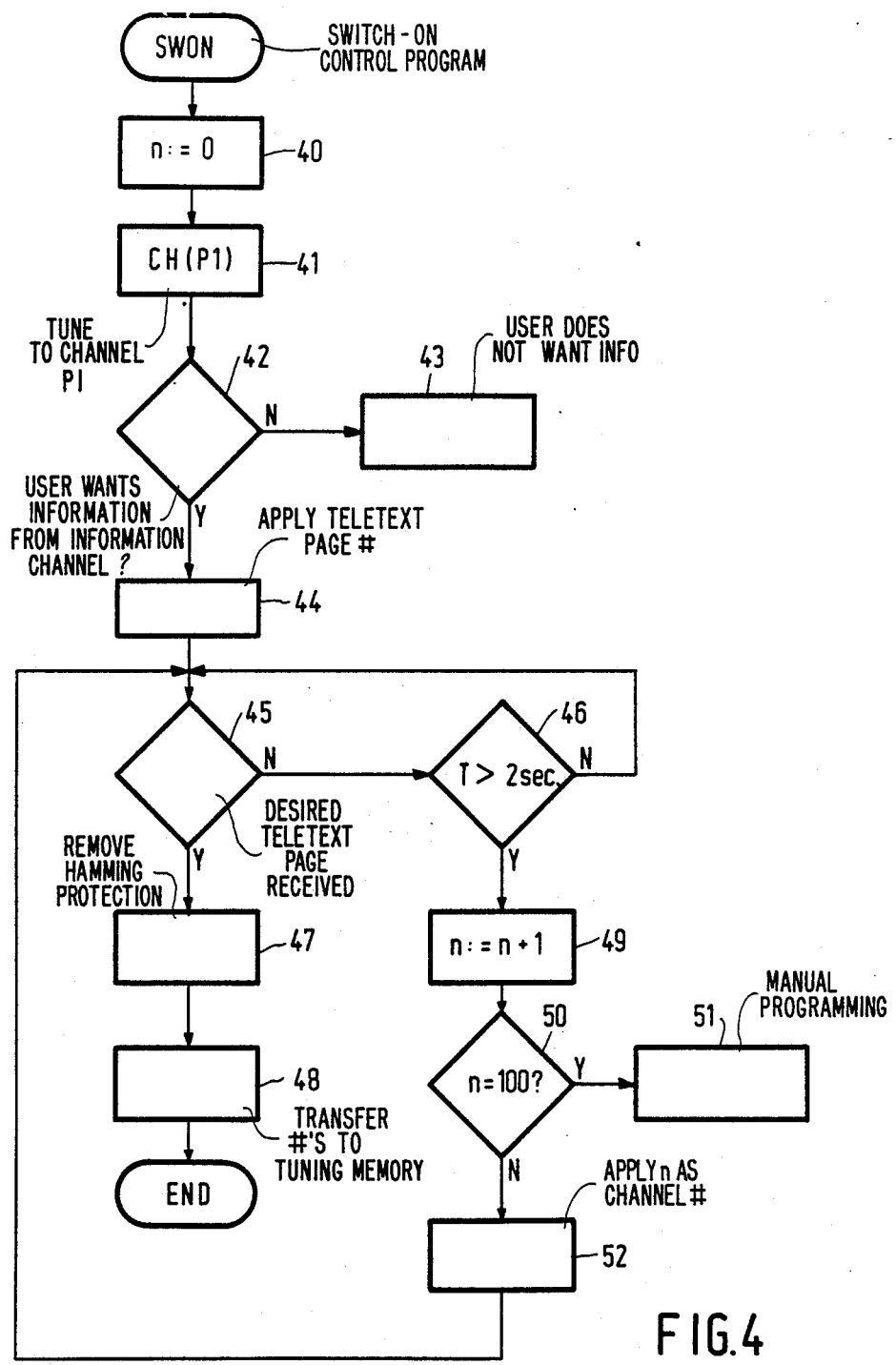

To ensure that after switching on the information channel, if present, is tuned to, the control programme memory of the microcomputer comprises, for example, the switch-on control program SWON shown in FIG. 4. In this program a software counter is reset in a first step 40, so that its counting position n assumes the value of zero. Subsequently the receiver is tuned in a step 41 to the channel in which the station P1 is transmitted. More particularly the channel number CH(P1) which is present in the tuning memory 17 is therefore applied to the interface circuit 16. Subsequently it is checked in a step 42 whether the user has depressed a key of the local control panel or of the control panel of the manual apparatus and thus wants to make it clear that he is not interested in the information in the information channel. This is indicated by step 43. If none of the keys of the control panels has been depressed, it is assumed that the user wishes "automatic programming" of the tuning memory. To realize this, the unique teletext page number aa stored in the control program memory is applied in a step 44 to the CCT decoder 13(2) which thus attempts to capture the relevant teletext page. This CCT decoder is built up in such a manner that it generates a status word having a first and a second value when the desired teletext page is received and is not (not yet) received, respectively. This status word can be called by the microcomputer. In a step 45, the microcomputer checks whether this status word has either the first or the second value. This is done during a given interval T of, for example, two seconds. As long as the status word has the second value, it is checked in a step 46 whether these two seconds have already elapsed. If within this two-second interval the status word assumes the first value, it means that the receiver is indeed tuned to an information channel. Of the information page transmitted therein and stored after reception in the page memory 13(3) the part located between the starting code cc and the final code ff is transmitted to the working memory of the microcomputer. This is effected in a step 47 in which step the channel numbers are deprived of a possible Hamming protection. The cleared channel numbers obtained hereby are subsequently transferred in a step 48 to the tuning memory 17 so that the channel number CH(Pq) with the station Pq is stored in a memory location of the tuning memory 17 which is accessible by generation of the number q with the aid of the digit keys on the manual apparatus of the remote control system. After performing this step 47, the switch-on programme has ended.

If the status word does not assume the first value within two seconds, a sub-control programme is started in which the receiver searches the information channel. This sub-control programme comprises a step 49 in which the counting position n of the software counter which was equal to zero until that moment, is raised by one. In a step 50 it is checked whether the new counting position has reached a given maximum value, in this case 100. If this is the case it means that there is no information channel present and that the user must change over to "manual programming". This is indicated by step 51 which may comprise, for example, a sub-step so as to make an appropriate text appear on the screen. However, if the maximum counting position is not reached yet, the actual counting position is applied as a channel number in a step 52 to the interface circuit 16 and the receiver is tuned to the relevant channel. Subsequently the programme is continued, commencing at step 45. In this manner an unknown channel number n can be maintained which corresponds to a channel in which a teletext information page is transmitted and the information incorporated therein regarding receivable channels can be automatically stored in the tuning memory 17 at sites which are directly accessible to the digit keys on the control panel.

The inventive idea explained hereinbefore with reference to a community antenna television system, namely to cause a known programme (information programme), transmitted in an unknown channel to be identified with a teletext page transmitted with this programme and having a unique page number can also be used in combination with signal sources other than the transmitter station of the community antenna television system; for example, in combination with a VCR, a video disc player, a video camera, a home computer. All these devices can be provided with a teletext page generator (for example, a ROM) which does not generate more than, for example, the page header (with line number 0) comprising the page and magazine number and possibly as a header text an indication of the source by which this page is generated. Each source has its own unique page number. For example, the VCR has the hexadecimal page number ab, the video disc player the page number ac, etc. All these page numbers as well as the associated magazine numbers are stored in the TV receiver in the control programme memory of the microcomputer 15.

Figure 5:
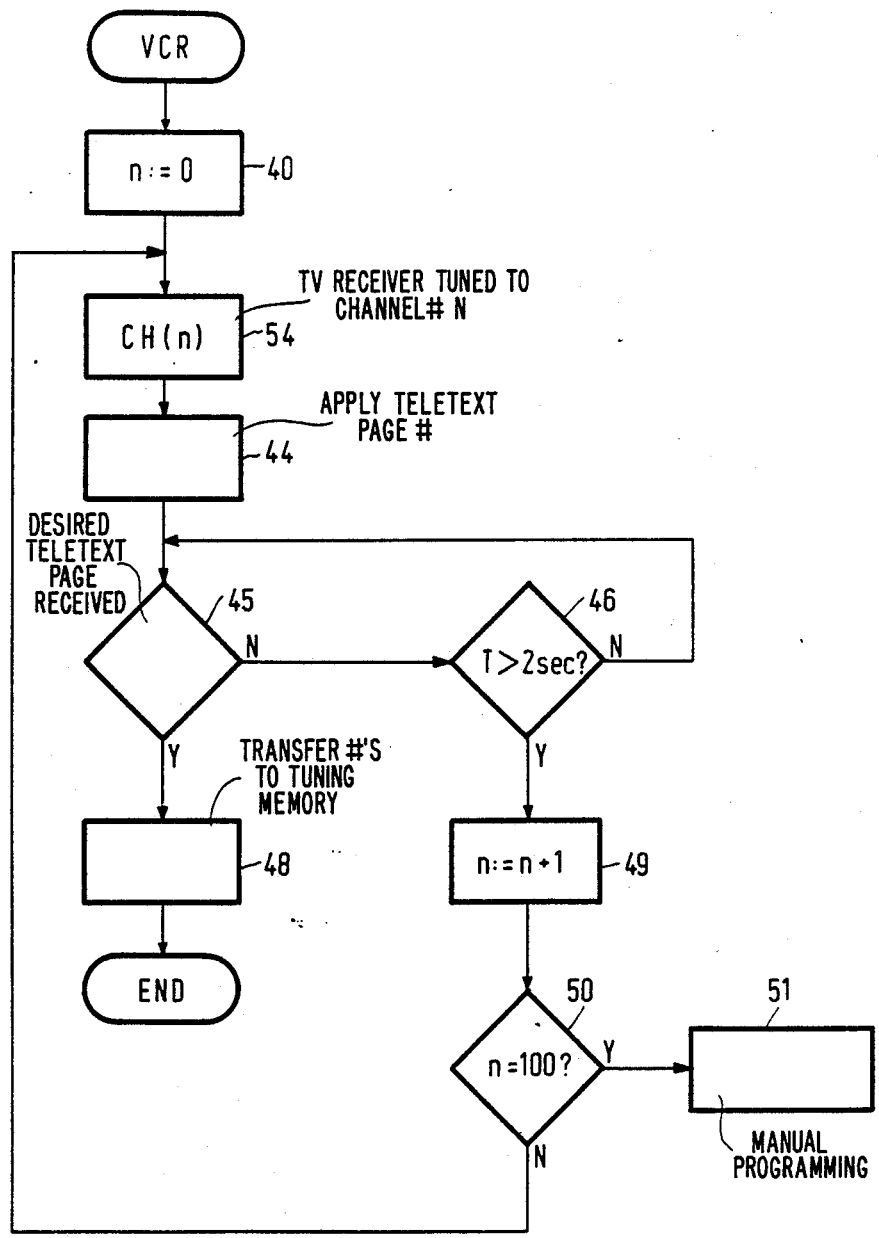

To find the channel numbers in which signals are transmitted by the different devices VCR, video disc player, camera, etc. the local control panel 21 is provided with device keys VCR, VLP, CAM and a search key SC. If, for example, both this search key SC and one of the device keys is depressed, the microcomputer 15 runs through the control programme shown in FIG. 5. This control programme largely corresponds to the programme shown in FIG. 4. Equal steps in the two control programmes have been denoted by the same reference numerals. The control programme shown in FIG. 5 differs from that in FIG. 4 at the following points. Instead of a step 41, this control programme includes a step 54 in which the TV receiver is tuned to channel number n. Furthermore this control programme does not include the steps 42, 43, 47 and 52 and after performing step 50 step 54 is performed.

In step 48 the channel number in which signals are transmitted by the relevant device is stored in a memory location of the non-volatile memory 17. In order to gain direct access to such memory locations, the manual apparatus 22 is provided with a number of apparatus keys which are denoted by TV, VCR, video disc player, CAT4, respectively. By depressing such a key, the TV receiver is directly tuned to the relevant channel.

What is claimed is:

1. A receiver comprising:
   (i) a teletext decoding circuit for capturing and decoding teletext pages;
   (ii) a programmable tuning data memory for programmably storing and for supplying translations of station identifiers into tuning data which are characteristic of respective transmission channels;
   (iii) a receiver tuning circuit for tuning the receiver to a transmission channel in response to a tuning datum from the tuning data memory; and
   (iv) a control circuit which is coupled to the teletext decoding circuit, to the tuning data memory, and to the tuning circuit and which controls a scanning and storing operation comprising controlling:
      (a) the tuning circuit to tune the receiver to a present channel;
      (b) the teletext decoding circuit to capture and decode teletext data from the present channel, control actions of (a) and (b) being repeated on further channels until teletext data is captured and decoded which includes at least a repetitive part of an information page including information regarding which transmission channels are utilized for transmitting TV stations; and
      (c) the tuning data memory to store tuning data in response to the information page, which tuning data are characteristic of the transmission channels indicated on the information page and utilized for transmitting TV stations, whereby the receiver thereafter automatically and repeatably associates all user requests for a desired station identifier with an appropriate tuning datum for an appropriate TV transmission channel according to the information captured and decoded from the information page.

2. The receiver of claim 1 comprising
   means for receiving a user request for use of the information page.

3. The receiver of claim 2 further comprising:
   means for generating a command for use of the information page in response to the user request,
   and wherein the control circuit is triggered by the command.

4. The receiver of claim 1 wherein
   the information page includes a repetitive information page number;
   the teletext decoding circuit signals any appearance of the information page number; and
   the control circuit repeats the control action of (a) and (b) until the information page number is found.

5. A television transmission system as claimed in claim 4 in which the information page number is a unique number so that the information channel is distinguished from other TV channels by the presence therein of a teletext page having said unique page number.

6. The receiver of claim 1 wherein the teletext data including the information page is received in a TV channel.

7. The receiver of claim 1 wherein the teletext data including the information page is received in an FM channel.

8. A method for automatically enabling tuning a receiver to a desired TV channel, the method comprising the steps of:
   (a) receiving at least one channel from a transmitter, one of said at least one channel, referred to herein as "the information channel", comprising teletext data defining a repetitive information page, which information page includes a respective channel number and a respective station number for each of the at least one channel;
   (b) automatically scanning the at least one channel to identify the information channel;
   (c) automatically tuning the receiver to the information channel;
   (d) automatically capturing and decoding the teletext data; and
   (e) automatically storing tuning data that is characteristic of the respective channel numbers indicated on said information page, whereby when a user thereafter requests a station number a respective channel number is automatically used rather than the requested station number.

9. The method of claim 8 wherein the transmitter is a CATV transmitter.

10. The method of claim 8 comprising the further steps of receiving a command from a user requesting use of the information channel and performing steps (b)-(e) in response to the command.

11. The method of claim 8 wherein the scanning step comprises identifying a unique page number which distinguishes the information page.

12. A television transmission system comprising:
   (A) a transmitter including:
      (i) means for generating teletext data representing a repetitive information page, which information page comprises information regarding which transmission channels are utilized for transmitting TV stations; and
      (ii) means for transmitting said teletext data in a transmission channel allotted thereto and referred to herein as "information channel"; and
   (B) a receiver comprising:
      (i) a teletext decoding circuit for capturing and decoding teletext pages;
      (ii) a programmable tuning data memory for programmably storing and for supplying tuning data which are characteristic of respective transmission channels;
      (iii) a receiver tuning circuit for tuning the receiver to a transmission channel in response to a tuning datum from the tuning data memory;
      (iv) a control circuit which is coupled to the teletext decoding circuit, to the tuning data memory, and to the tuning circuit and which controls a scanning and storing operation comprising controlling:
         (a) the tuning circuit to tune the receiver to a present channel;
         (b) the teletext decoding circuit to capture and decode teletext data from the present channel, the control actions of (a) and (b) being repeated on further channels until teletext data is captured and decoded which includes at least a repetitive part of the information page; and
         (c) the tuning data memory to store tuning data in response to the information page, which tuning data are characteristic of the TV channels indicated on the information page and utilized for transmitting TV stations, whereby the receiver thereafter automatically and repeatably associates all user requests for a desired station identifier with an appropriate tuning datum for an appropriate TV channel according to the information captured and decoded from the information page.

13. The system of claim 12 comprising
means for receiving a user request for use of the information page.

14. The receiver of claim 13 further comprising:
means for generating a command for use of the information page in response to the user request;
and wherein the control circuit is triggered by the command.

15. The receiver of claim 12 wherein
the information page includes a unique page number;
the teletext decoding circuit signals any appearance of the unique page number; and
the control circuit repeats control actions of (a) and (b) until the unique page number is signalled.

16. The receiver of claim 12 wherein the teletext data including the information page is transmitted to the receiver in a TV channel.

17. The receiver of claim 1 wherein the teletext data including the information page is transmitted to the receiver in an FM channel.

* * * * *